United States Patent [19]

Bass

[11] 4,252,905
[45] Feb. 24, 1981

[54] METHOD OF PREPARING A MIXTURE OF ION EXCHANGE RESINS

[75] Inventor: Walter C. Bass, Bridgewater, N.J.

[73] Assignee: Ecodyne Corporation, Chicago, Ill.

[21] Appl. No.: 55,166

[22] Filed: Jul. 6, 1979

[51] Int. Cl.³ .......................... B01J 39/08; B01J 41/08
[52] U.S. Cl. ...................................................... 521/28
[58] Field of Search ........................................... 521/28

[56] References Cited

U.S. PATENT DOCUMENTS

| | | | |
|---|---|---|---|
| 2,684,321 | 7/1954 | Thurmon et al. | 210/37 |
| 2,850,439 | 9/1958 | Bodkin | 197/147 |
| 3,205,184 | 9/1965 | Hatch | 210/38 |
| 3,250,702 | 5/1966 | Levendusky | 521/28 |
| 3,250,703 | 5/1966 | Levendusky | 521/28 |
| 3,409,566 | 11/1968 | Levendusky | 521/28 |
| 3,645,922 | 2/1972 | Weiss et al. | 521/28 |
| 3,941,724 | 3/1976 | Bolto | 521/28 |

OTHER PUBLICATIONS

"Ion Exchange"-F. Helfferich (1962) pp. 59–60.
CRC Press, Inc. Crushing & Grinding–Lowrison 1974 pp. 35–114.
Chromatography–Heftmann 1967 Reinhold–C.I.T. Pasadena, Ca. pp. 262–294.
Ion Exchangers–1972 pp. 31–60, Konrad Dorfner, Ph.d.–Ann Arbor Science.

*Primary Examiner*—Joseph L. Schofer
*Assistant Examiner*—Peter F. Kulkosky
*Attorney, Agent, or Firm*—Hume, Clement, Brinks, Willian & Olds, Ltd.

[57] ABSTRACT

A method of preparing a mixture of cation and anion exchange resins in the size range of about 10 to 250 microns, comprising combining cation exchange resins and anion exchange resins of a size larger than 60 mesh and grinding the combination of anion and cation exchange resins to a size range of about 10 to 250 microns.

7 Claims, No Drawings

METHOD OF PREPARING A MIXTURE OF ION EXCHANGE RESINS

BACKGROUND OF THE INVENTION

The present invention relates to a method of preparing a mixture of cation exchange resins and anion exchange resins in a size range of about 10 microns (less than 400 mesh) to about 250 microns (60 mesh) from resins larger than about 60 mesh, for use in precoating a filter. The 10 to 250 micron size range of ion exchange resins is particularly suited to reduce dissolved and undissolved impurities in solution from a level of about 50 parts per billion to about 10 parts per billion or less.

In the prior art, methods and apparatus, such as a filter, using a precoat of ion exchange resin particles smaller than 250 microns (60 mesh) are known, as set forth in U.S. Pat. Nos. 3,250,702 and 3,250,703, assigned to the assignee of the present invention. Ion exchange resins in a size range of about 10 to 250 microns are referred to herein as "finely divided" resin particles, while resin particles in the size range of about 20 to 60 mesh (about 840 to about 250 microns) are referred to as "large bead" resin particles.

A method of producing ion exchange resin particles smaller than 250 microns from large bead resins is known in the art, such as disclosed in U.S. Pat. No. 3,409,566, assigned to the assignee of the present invention. This method comprises grinding the large bead resin particles in a hammer mill to a size range of about 60 to 400 mesh, with a major portion by weight of the resulting resin particles being in a size range of about 200 to 400 mesh (74 to 37 microns).

According to the prior art method, a mixture of cation and anion exchange resins in the size range of about 60 to 400 mesh is prepared in two steps. First, large bead cation and anion exchange resins are ground separately, to produce resin particles predominately in the size range of about 60 to 400 mesh. Then the cation and anion exchange resins are mixed in suitable ratios for use in preparing a slurry of resin particles to be precoated on a filter element. Such a mixing operation is typically performed by an operation of the filtration unit in which the resins are to be used.

Mixing the anion and cation exchange resins after grinding, as in the prior art, produces a combination of resins that includes a number of resin particles of the large bead size and a number of particles of a size smaller than about 32 microns, hereinafter referred to as "fines." It is known in the art that it is desirable to minimize the number of fines and large bead resins in a combination of resin particles.

In the prior art, cation exchange resin fines are often removed and discarded after grinding the cation exchange resin, to reduce the possibility of fouling a filter on which the cation exchange resin will be precoated. Anion exchange resin fines are usually not removed and discarded because anion exchange resins are generally more expensive than cation exchange resins.

SUMMARY OF THE INVENTION

According to the present invention, there is provided a method of producing a mixture of anion and cation exchange resins having a more narrow size distribution than the mixtures produced by the methods of the prior art. Instead of grinding the cation and anion exchange resins separately as in the prior art, the anion and cation exchange resins are mixed in a large bead form, and then ground until substantially all of the resin particles are in a size range of about 10 to 250 microns.

The preferred forms of the resins are the ammonium and hydrogen form of the cation exchange resin and the hydroxide form of the anion exchange resin. A preferred embodiment of the present invention includes grinding the combination of anion and cation exchange resins by feeding the combination into a hammer mill having a stirrup-type rotor, and a retainer screen with uniform aperture sizes between about 0.020 and 0.070 inches.

The method of the present invention produces a mixture of anion and cation exchange resin particles having a more narrow particle size distribution than the mixtures produced by the methods of the prior art. In some cases, a reduction in the number of large bead resin particles of approximately fifty percent results from the method the present invention in comparison with the prior art method of grinding resin particles separately and then mixing them. This reduction of large bead particles permits the ion exchange resin to be more efficiently utilized during filtration, and the ion exchange capacity of the resin per unit weight is thereby increased over resin mixtures produced with prior art methods. Also, with both cation and anion exchange resins combined in a single product and pre-mixed to a desired ratio, errors by the filter unit operator in mixing the cation and anion exchange resins are eliminated.

It has also been discovered that the mixture of cation and anion exchange resins prior to grinding reduces the offensive odor that characterizes the anion exchange resin alone. Also, the method of the present invention produces such a relatively narrow particle size distribution that it is not necessary to remove small cation exchange resin fines from the resin mixture.

DESCRIPTION OF THE PREFERRED EMBODIMENTS

According to a preferred embodiment of the present invention, anion and cation exchange resins are combined in large bead form, and the combination of anion and cation exchange resins is ground until substantially all of the particles are in a size range of about 10 to 250 microns.

The preferred ratio of cation exchange resin to anion exchange resin used in the method of the present invention is from 3:1 to 1:1. The anion exchange resin is preferably a strongly basic styrene-divinylbenzene type having quaternary ammonium active groups. Several suitable resins are DOWEX SBR and DOWEX SBR-P (Dow Chemical Co., Midland, Michigan), AMBERLITE IRA-400 (Rohm and Haas Co., Philadelphia, Pa.), and IONAC X-220 (Ionac Chemical Co., Birmingham, N.J.). The cation exchange resin is preferably a strongly acidic styrene-divinylbenzene type having sulfonic acid active groups. Several suitable cation exchange resins are DOWEX HGR-S (Dow Chemical Co., Midland, Michigan), AMBERLITE IR-120 (Rohm and Haas Co., Philadelphia, Pa.), and IONAC C-267 (Ionac Chemical Co., Birmingham, N.J.). Preferred forms of the resins according to the present invention are the hydroxide form of the anion exchange resin, and the hydrogen or ammonium form of the cation exchange resin.

Although the typical range of finely divided resins is between 60 and 400 mesh, it has been determined that if filter elements are designed to resist fouling and blocking by particles smaller than 400 mesh (37 microns), significant increases in ion exchange efficiency can be obtained by the use of particles smaller than 400 mesh. The size of the particles is measured with a standard electronic counting method such as a Coulter Counter Model TA-II sold by Coulter Electronics, Inc. of Hialeah, Florida. The dimension determined by the Coulter Counter is the diameter of a sphere having the same volume as the particle measured. According to the present invention, mixtures having substantially all of the ion exchange resin particles in a size range of about 10 to 250 microns are produced.

The way in which the method of the present invention produces a particle mixture having fewer large bead particles than mixtures of cation and anion exchange resin particles ground separately according to the prior art is not fully understood. The cation exchange resin is typically harder than the anion resin, and it is believed that the cation exchange resin assists the action of the rotor of the hammer mill in grinding the anion and cation exchange resins, thus reducing or eliminating the amount of large bead particles in a resin mixture. In fact, it has been found that particle size distribution according to the method of the present invention is, in part, controlled by the ratio of cation resin to anion resin.

The preferred mill used according to the present invention is a hammer mill. Any hammer mill may be used and many are well known. It is believed that other mills that can be employed to carry out the present invention are comminution or knife mills, pin mills, disc mills, and fluid energy or jet grinding mills. An exemplary hammer mill is the Model A Pulva-Sizer sold by the Pulva Corporation, Perth Amboy, New Jersey. The rotor of the Pulva-Sizer hammer mill has stirrup-type hammers, operating at a tip speed of about 21,000 feet per second (9600 rpm). Particles are fed into the mill at a rate of about 180 to 200 pounds per hour by operating a feed motor at about 1900 to 2600 revolutions per minute. The screen used in the mill to retain the particles preferably has uniform holes with an aperture size between about 0.020 and 0.070 inches. The aperture, or screen-size opening, is the minimum clear space between the edges of an opening in the screen. Another preferred screen is a 1/16 inch herringbone screen.

The examples below are intended to set forth applications of the method of the present invention, and are not intended to limit the scope of the present invention.

EXAMPLE 1

Typical commercially available large bead unground resin was found to have the following size distribution determined by passing a dry, packed volume of 100 cc through the following screens:

|  | Volume Percent Retained | |
|---|---|---|
| U.S. Mesh No. | Cation | Anion |
| 16 | 1–8 | Trace-1 |
| 20 | 43–53 | 5–22 |
| 30 | 28–43 | 23–45 |
| 40 | 10–20 | 40–50 |
| 50 | 1–3 | 5–15 |
| 60 | Trace | Trace |

Cation and anion exchange resins were ground separately as in the prior art using a Pulva-Sizer hammer mill with a 1/16" herringbone screen, a rotor speed of 9600 rpm (21,000 feet per second), and a feed rate of about 200 pounds/hr. A particle size distribution for various resins was calculated by standard Coulter Counter TA-II analysis to determine percent of resins smaller than 32 microns and by a 60-mesh screen analysis with a dry, packed 100 cc volume to determine percent large bead resins.

The Coulter Counter TA-II was operated with a 560 micron aperture, and calibration was accomplished with 18.04 micron nominal diameter polystyrene microspheres available from Coulter Electronics, Inc., Hialeah, Florida. The electrolyte was prepared by mixing 6% to 8% NaCl by weight in demineralized water, and adding glycerin to about 15% by volume to increase liquid viscosity. Ion exchange resin was added to a sample beaker for the Coulter Counter until the concentration index was between about 14 to about 22 percent. The ion exchange resin sample was dispersed by a stirring rod. The results were as follows:

| | percent | |
|---|---|---|
| Resin (form) | Large Bead (By Weight) | Smaller Than 32 Microns (By Weight) |
| DOWEX SA 2025 ($NH_4^+$) | 3.4 | 14.9 |
| DOWEX HCR-S-H ($H^+$) | 2.9 | 18.9 |
| Rohm and Haas AMBERLITE IR-120 H ($H^+$) | 2.2 | 21.7 |
| Rohm and Haas AMBERLITE IRA-400 ($OH^-$) | .25 | 34.7 |

The individually ground resins were then hand mixed in various ratios, and the percent of large bead resins was determined by a 60-mesh analysis as above. Then several large bead resins were mixed in various ratios as set forth below, and the mixtures were ground according to the present invention in the same Pulva-Sizer hammer mill, described above. The percent of large bead resins was also determined as above. These results are set forth below, including the percent decrease in large bead resins for various mixtures of cation to anion exchange resin ground according to the present invention in comparison with prior art methods:

| Resin Mixture | Percent Large Bead Resins By Weight (Hand Mixed) | Percent Large Bead Resins By Weight (Present Invention) | Percent Decrease in Large Bead Resins |
|---|---|---|---|
| 1 to 1 RATIO: | | | |
| DOWEX SA 2025 ($NH_4^+$)/ Rohm and Haas AMBERLITE IRA-400 ($OH^-$) | 1.8 | 1.0 | 44 |
| DOWEX HCR-S-H ($H^+$)/Rohm and Haas AMBERLITE IRA-400 ($OH^-$) | 1.6 | 0.9 | 43 |

-continued

| Resin Mixture | Percent Large Bead Resins By Weight (Hand Mixed) | Percent Large Bead Resins By Weight (Present Invention) | Percent Decrease in Large Bead Resins |
|---|---|---|---|
| Rohm and Haas AMBERLITE 120 H (H+)/Rohm and Haas AMBERLITE IRA-400 (OH−) | 1.2 | 0.7 | 42 |
| 2 to 1 RATIO: | | | |
| DOWEX SA 2025 (NH4+)/Rohm and Haas AMBERLITE IRA-400 (OH−) | 2.4 | 1.5 | 38 |
| DOWEX HCR-S-H (H+)/Rohm and Haas AMBERLITE IRA-400 (OH−) | 2.0 | 0.8 | 60 |
| Rohm and Haas AMBERLITE 120 H (H+)/Rohm and Haas AMBERLITE IRA-400 (OH−) | 1.6 | 1.0 | 38 |
| 3 to 1 RATIO: | | | |
| DOWEX SA 2025 (NH4+)/Rohm and Haas AMBERLITE IRA-400 (OH−) | 2.6 | 2.0 | 23 |
| DOWEX HCR-S-H H (H+)/Rohm and Haas AMBERLITE IRA-400 (OH−) | 2.2 | 1.1 | 50 |
| Rohm and Haas AMBERLITE 120 . H (H+)/Rohm and Haas AMBERLITE IRA-400 (OH−) | 1.7 | 1.1 | 35 |

The percent of large bead particles in the resin mixtures according to the method of the present invention is thus decreased by between 24 to 60 percent over the prior art methods.

EXAMPLE 2

DOWEX NH4+, DOWEX H+, and Rohm and Haas OH− resins as in Example 1 were individually ground in a Pulva-Sizer hammer mill as in Example 1, but with a feed rate of about 180 pounds/hr. A Standard Coulter Counter TA-II analysis as in Example 1 was run on these resins to determine the percent by weight smaller than 32 microns. The resins were then hand mixed in the ratios set forth below and the percent smaller than 32 microns likewise calculated. Last, DOWEX NH4+, and Rohm and Haas OH− resins as in Example 1 were mixed as set forth below, and ground according to the present invention in the same Pulva-Sizer hammer mill at the same feed rate. The results are as follows:

| Resin (form) | Percent of Particles Smaller Than 32 Microns (By Weight) |
|---|---|
| Individually Ground DOWEX HCR-S-H (H+) | 21.6 |
| Individually Ground DOWEX SA 2025 (NH4+) | 15.5 |
| Individually Ground Rohm and Haas AMBERLITE IRA-400 (OH−) | 31.1 |
| Hand Mixed (2:1) DOWEX HCR-S-H (H+)/Rohm and Haas AMBERLITE IRA-400 (O H−) | 25.5 |
| Hand Mixed (2:1) DOWEX SA 2025 (NH4+)/Rohm and Haas AMBERLITE IRA-400 (O H−) | 18.9 |
| Mixed Ground (2:1) DOWEX HCR-S-H (H+) Rohm and Haas AMBERLITE IRA-400 (OH−) | 26.4 |
| Mixed Ground (2:1) DOWEX SA 2025 (NH4+)/Rohm and Haas AMBERLITE IRA-400 (OH−) | 24.2 |

The grinding of resins according to the present invention produces a slight increase in the number of small fines over the prior art method. This increase has not been shown to be detrimental.

Though the embodiments above described are preferred other refinements and embodiments which do not depart from the true spirit and scope of the present invention may be conceived by those skilled in the art. It is intended that all such modifications be covered by the following claims.

I claim:

1. A method of preparing a mixture of cation and anion exchange resin particles substantially all of which are in a size range of about 10 to 250 microns, comprising:
    combining large bead cation and anion exchange resin particles; and
    grinding the combination of anion and cation exchange resin particles to a size range of about 10 to 250 microns.

2. A method of preparing a filter precoat medium having particles substantially all in a size range of about 60 to 400 mesh, comprising:
    combining large bead anion and cation exchange resin particles; and
    grinding the combination of anion exchange resin and cation exchange resin particles to a size range of about 60 to 400 mesh.

3. The method of claims 1 or 2 wherein the step of grinding reduces the combination of particles to a size range of about 10 to 40 microns.

4. The method of claim 1 or 2 wherein the cation exchange resin is in the ammonium form and the anion exchange resin is in the hydroxide form.

5. The method of claims 1 or 2 wherein the cation exchange resin is in the hydrogen form and the anion exchange resin is in the hydroxide form.

6. The method of claims 1 or 2 wherein the ratio by weight of cation exchange resins to anion exchange resins is between 3 to 1 and 1 to 1.

7. The method of claims 1 or 2 wherein the step of grinding the combination of anion and cation exchange resins includes feeding the resin combination into a hammer mill having a retaining screen with uniform aperture sizes between about 0.020 to 0.070 inches.

* * * * *

UNITED STATES PATENT AND TRADEMARK OFFICE
CERTIFICATE OF CORRECTION

PATENT NO. : 4,252,905
DATED : February 24, 1981
INVENTOR(S) : Walter C. Bass

It is certified that error appears in the above-identified patent and that said Letters Patent are hereby corrected as shown below:

Column 4, line 35, delete "percent".

Column 4, line 36, delete "Smaller", add --Percent-- over first column of numbers, and add --Percent Smaller-- over second column of numbers.

Column 4, line 37, delete "h".

Column 5, line 67, add --/--.

Column 5, lines 68 and 69, close up space therebetween.

Signed and Sealed this

Thirtieth Day of June 1981

[SEAL]

Attest:

RENE D. TEGTMEYER

*Attesting Officer*    *Acting Commissioner of Patents and Trademarks*